Dec. 1, 1953 E. E. TINKER 2,661,096
STRAINER
Filed May 31, 1950
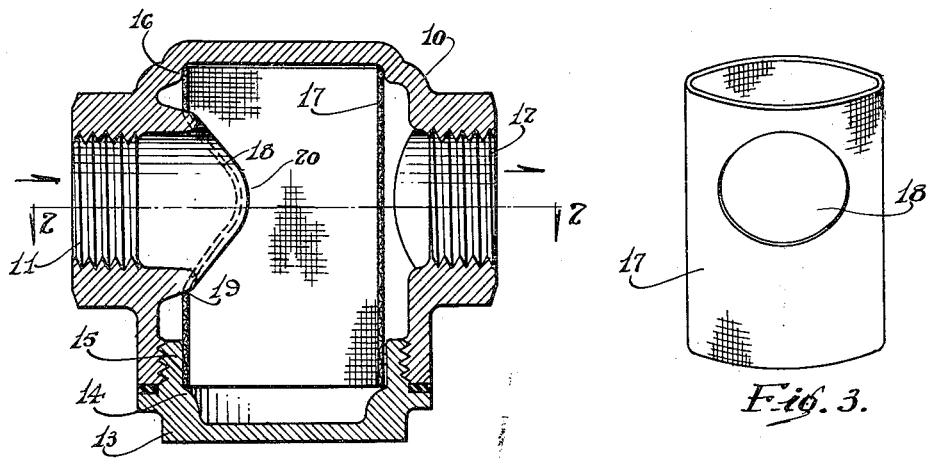
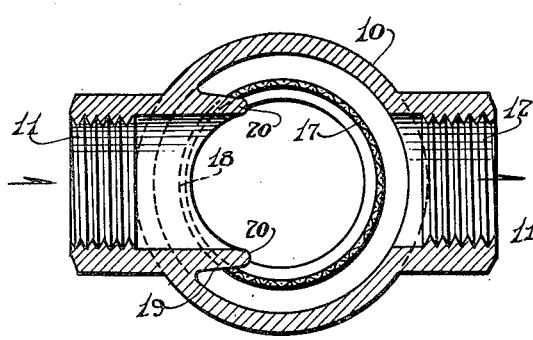
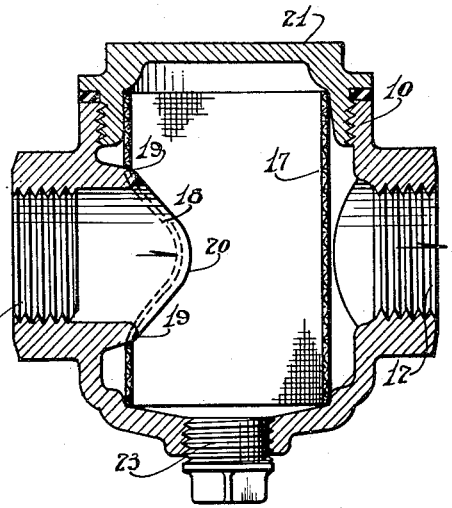
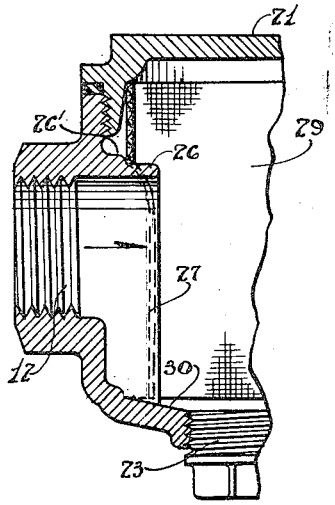
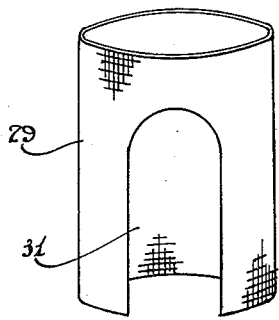
INVENTOR
Earl E. Tinker
BY *Cushman, Darby & Cushman*
ATTORNEYS Patented Dec. 1, 1953

2,661,096

UNITED STATES PATENT OFFICE 2,661,096

STRAINER

Earl E. Tinker, Decatur, Ill., assignor to Mueller Co., Decatur, Ill., a corporation of Illinois Application May 31, 1950, Serial No. 165,290

8 Claims. (Cl. 210—165)

The invention herein disclosed relates to liquid strainers and has for its object to provide a strainer having a direct liquid flow therethrough which flow is interrupted by a strainer only so that all impurities will be eliminated and can be removed. A further object is to provide a construction in which the strainer can be removed and inserted without the necessity of taking down the line in which the strainer body is mounted, thus providing for cleaning and replacement of the strainer in a convenient fashion.

These objects are accomplished by providing a body portion having a strainer receiving chamber having an aligned inlet and outlet to provide a direct line of flow of the liquid into, through, and out of the chamber. In that strainer chamber is mounted a filter screen having an opening on the inlet side to permit direct flow of liquid into the screen. From the screen the filtered liquid passes directly to the outlet, thus giving a direct flow through the strainer. It is essential that there be no leakage around the screen to permit unfiltered liquid to pass to the outlet, and to prevent any such leakage, the inlet opening is provided with an inwardly projecting flange having an inclined screen engaging surface which engages the opening in the screen with a wedging action, such flange having extended side members, these side members having curved edges so as to permit the screen to be inserted past this projecting flange into the chamber in the body of the strainer.

The invention is illustrated in the drawings herewith, and in said drawings,

Figure 1 is a view in vertical section of one form of strainer;

Figure 2 is a view in horizontal section of the strainer shown in Figure 1 on substantially the line 2—2 of Figure 1.

Figure 3 is a view of the screen used in the strainers shown in Figures 1 and 2.

Figure 4 is a view in vertical section of a strainer of slightly modified form;

Figure 5 is a vertical section of a strainer having a slightly modified form of inlet; and Figure 6 is a view of the screen used in the form of the invention shown in Figure 5.

Referring to the drawings by numbers, the same numbers designating the same parts in the several views, 10 indicates the strainer body having a large screen chamber and provided with an inlet 11 and an outlet 12, here shown as in direct alignment with each other, a preferred form, as it permits direct flow with no interruption except the screen. At the lower end of the body portion 10 is provided a screw closure 13 having a screen-holding ledge 14 to support the lower end of the screen and seal it against liquid flow. The flange 15 of the closure 13, it will be seen, extends upwardly a considerable distance over the end of the bottom of the screen so as to guard against leakage past the screen. At its upper end the screen engages a similar ledge 16 in the top of the strainer body so as to guard against leakage around the top of the screen.

The screen 17 is of cylindrical form and of a mesh needed for the particular filtering operation, the screen being provided on the inlet side with an opening 18 so as to permit unimpeded flow from the inlet opening 11 to the screen, the interior of the strainer body, and to the outlet. To engage the opening 18 in the screen, the inlet is provided with an inwardly projecting flange 19 the outer wall of which is inclined to wedge into opening 18 in the screen to closely engage the screen opening and prevent any leakage past the screen so that the inlet flow must be always through the screen and this sealing off of the screen inlet adds to the protection afforded by the sealed off ends of the screen. Preferably, this inwardly projecting portion or rim 19 has a plurality, two being here shown, of extended portions 20 having curved edges, which extended portions serve to hold the screen 17 in place and yet are of such form that the screen may be readily thrust past them into the chamber in the screen body and removed therefrom without undue distortion of the screen and without the necessity of taking down the fixture to permit insertion and removal of the screen.

In the form of the invention shown in Figure 4, the construction is generally similar to that form shown in Figure 1, there being provided the screen chamber and the inlet and outlet, exactly as in the form shown in Figure 1. In this form the screen-holding cap 21 is provided at the top of the body of the strainer and at the bottom the body portion is provided with a drain plug 23 so that the filtered-out material can be drained out of the strainer whenever desired. The same type of screen having the inlet opening to engage the projecting flange at the inlet is provided.

In the form of the invention shown in Figure 5, the construction is identical with that shown in Figure 2 insofar as the closure, clean out plug, and inlet and outlet are concerned. In this modified form, however, the inwardly projecting flange and its cooperating screen are of slightly different construction. The flange 26 projects inwardly as in the other forms and has a screen engaging shoulder 26', but it also extends downwardly in the form of an open skirt 27 so that the flow from the inlet will be directed by this skirted projection into the screen 29 and leakage about the screen avoided. It will be seen that the open skirt 27 forms a flow throat and projects downwardly and is formed integral with the floor 30 of the chamber so as to prevent passage of liquid below this skirted extension. The construction shown in Figure 5, while embodying the same principle as that disclosed in the other figures, has been found to be a useful and satisfactory modification. In this form of the invention, the screen, as shown in Figure 6, will have a longitudinal opening 31, open at its lower end so as to slide over the skirted extension 27, its upper end being curved at the top to fit over the curved projections 26.

A strainer constructed in accordance with the present invention has the advantage of permitting a direct through flow of the liquid from the inlet to the outlet without any interruption except the interposed filter screen. The filtering means is so disposed as to ensure filtering out of impurities in the liquid and is so combined with the strainer body as to eliminate danger of leakage around the screen and passage of unfiltered material to the outlet. It will be seen that the relatively large screen chamber and screen ensure a large volume of water in the chamber so that flow will be constant at the outlet. Further, the construction has been developed so as to permit ready insertion and removal of the screen without the necessity of taking down the line or disturbing the setup in any way other than to remove the closure for the chambered body.

I claim:

1. A strainer of the class described comprising: a body forming a screen chamber having one open end, a side inlet, and an outlet; a removable closure for said body forming an end wall for the open end of said chamber; a cylindrical screen within said chamber having a side opening facing said inlet, the ends of said screen being in engagement with the end walls of said chamber; and a flange projecting into said chamber from said inlet and into said screen opening, said flange engaging the edges of said screen opening about their entire extent and having an end edge configuration conforming substantially to the edge configuration of said screen opening, whereby said flange overlaps said screen opening edges by a substantially equal amount about their entire extents, and the maximum distance between the end edge of said flange and the opposite wall of said screen chamber being at least as large as the outer diameter of said screen in order to facilitate introduction and removal of said screen.

2. The structure defined in claim 1 wherein the screen chamber is cylindrical and the screen is coaxial therewith.

3. The structure defined in claim 1 in which the outlet is in a side of the chamber and the screen is open-ended, and including means defining coaxial circular recesses in the end walls of the screen chamber having side wall surfaces engaging the exterior marginal end portions of said screen to maintain the latter in engagement with the inlet flange.

4. The structure defined in claim 1 including a drain plug in the end wall of the chamber opposite the closure.

5. The structure defined in claim 1 in which the side opening in the screen is circular.

6. The structure defined in claim 1 in which the screen is open-ended and the side opening in the screen is in the form of a slot having parallel side edges and extending longitudinally of the screen from that end thereof opposite the chamber closure.

7. The structure defined in claim 1 in which the outer wall of the flange is shouldered to form a seat for engagement with the edges of the screen opening.

8. A strainer of the class described comprising: a body forming a screen chamber having one open end, a side inlet, and an outlet; a removable closure for said body forming an end wall for the open end of said chamber; a cylindrical screen within said chamber with the ends of said screen in engagement with the end walls of said chamber, said screen having at least one open end facing the end wall of said chamber opposite said closure and said screen having a side wall slot extending longitudinally inwardly from said open end thereof and facing said inlet; and a flange projecting into said chamber from said inlet and into said screen slot, said flange engaging the edges of said screen slot about their entire extent.

EARL E. TINKER.

References Cited in the file of this patent

UNITED STATES PATENTS

| Number | Name | Date |
| --- | --- | --- |
| 1,115,784 | Cranwell et al. | Nov. 3, 1914 |
| 1,352,120 | Dupont | Sept. 7, 1920 |
| 1,908,925 | Semon et al. | May 16, 1933 |
| 1,917,203 | Heinz | July 4, 1933 |
| 1,971,733 | Shimer | Aug. 28, 1934 |
| 2,399,994 | Feagin | May 7, 1946 |